United States Patent [19]

Zahradnik et al.

[11] 3,972,461
[45] Aug. 3, 1976

[54] GUIDE CHUTE ARRANGEMENT FOR WEB FEEDING APPARATUS

[75] Inventors: George J. Zahradnik, Wheaton; Arthur A. Pudark, Downers Grove; Carl L. Turner, Mount Prospect, all of Ill.

[73] Assignee: A. B. Dick Company, Chicago, Ill.

[22] Filed: May 15, 1975

[21] Appl. No.: 577,704

[52] U.S. Cl. ................................. 226/89; 226/196
[51] Int. Cl.² ........................................ B65H 23/04
[58] Field of Search ................. 226/89, 90, 91, 196

[56] References Cited
UNITED STATES PATENTS

| | | | |
|---|---|---|---|
| 2,080,061 | 5/1937 | Pringle | 226/89 X |
| 3,307,762 | 3/1967 | Boughrum | 226/89 |

*Primary Examiner*—Richard A. Schacher
*Attorney, Agent, or Firm*—Ronald J. LaPorte; Peter S. Lucyshyn

[57] ABSTRACT

A guide chute arrangement for an apparatus used to feed a computer form printout web to the original document platen of a copying machine which includes a pivotally mounted copyboard overlying the platen over and about which the web is fed, includes an upper chute assembly for guiding the web between the upper surface of the copyboard and a first supply tray and a lower chute assembly for guiding the web between the lower surface of the copyboard and a second supply tray. Each of the chute assemblies includes complementarily, predeterminedly shaped upper and lower walls forming channels therebetween. The lower walls of the chute assemblies are fixedly mounted. The upper wall of the upper chute assembly is mounted for pivotal movement on extension arms which permit the movement of the upper wall away from the lower wall for easy threading of the web thereinto. The upper wall of the lower chute assembly is pivotal about its lower end and includes pins at the upper end received in a predeterminedly shaped guide channel formed in the support frame of the copyboard so that upon pivoting the copyboard out of the position overlying the platen, the pins are moved through the channel pivoting the upper wall of the lower chute assembly about its lower end thereby to separate the upper wall from the lower wall for easy threading of the web.

9 Claims, 2 Drawing Figures

GUIDE CHUTE ARRANGEMENT FOR WEB FEEDING APPARATUS

BACKROUND OF THE INVENTION

This invention relates generally to segmented web feeding apparatus and more particularly to such apparatus for feeding a computer form web between a pair of stations along a copyboard overlying the original document platen of a copying machine for making copies of individual segments of the form.

Because of the widespread use of computers for storing and retrieving information, the need for inexpensive copies of computer printout webs has increased. At this time, a good way of obtaining such copies is through the use of an electrostatic or the like copier.

Because manually feeding successive portions of the computer form web to an original document platen of a copier for reproduction is rather difficult and time consuming, apparatus for carrying out the latter on an automatic basis has been provided. One such computer form feed apparatus for use in conjunction with a copying machine for feeding computer printout webs to the original document platen thereof includes first and second feed trays between which a fan fold or segmented web computer printout form is fed to an overlying original document platen of the copier. The web passes from the first tray through a chute provided to guide the web onto a first surface of the copyboard. The web extends along the first surface of the copyboard, is thereafter carried about the free end of the copyboard and then along the lower surface thereof across the platen. The web continues through a second chute to the other supply tray. A pair of sprocket drive devices provides the direct driving force to move the web along the path and a drive mechanism coupled to the sprocket devices drives the latter. A more detailed description of the sprocket drive device and drive mechanism can be obtained from co-pending U.S. patent applications Ser. Nos. 577,703, filed May 15, 1975 and 577,705 filed May 15, 1975 entitled Drive Mechanism for Computer Form Feeder Apparatus and Sprocket Drive and Stripper Arrangement for Computer Form Feeder Apparatus, respectively, filed the same date as the subject applicaton and assigned to the same assignee.

In the computer form feed apparatus described, it was found that "threading" the web into the first and second chutes and over and round the copyboard to prepare the web for copying was somewhat difficult. The chutes which are relatively narrow and shaped in such a manner so as to provide proper guidance to the web between the trays, do not lend themselves to threading of the web therethrough. With the copyboard being pivotal about one end, wrapping the web thereabout was made easier, but insertion of the web into the guide chutes remained difficult. To overcome this difficulty, an improved chute arrangement was required.

SUMMARY OF THE INVENTION

Accordingly, it is a primary object of the present invention to provide a new and improved guide chute arrangement for a computer form feed apparatus of the type described which makes threading of a computer printout web to be copied relatively easy.

It is another object of the present invention to provide in a computer form feeder apparatus of the type described a mechanism for automatically opening a guide chute thereof for threading a computer printout web therethrough in response to the pivoting of the copyboard from a "copying" to a "non-copying" position.

It is still another object of the present invention to provide a chute arrangement for guiding a computer printout web in a computer form feeder apparatus of the type described which is movable between open and closed positions for threading and guiding, respectively, a web therethrough.

Briefly, a preferred embodiment of the improved guide chute arrangement according to the invention includes first and second guide chute assemblies mounted adjacent opposite surfaces of a first end of a copyboard carrying a computer printout web across an original document platen of a copying machine.

Both chute assemblies include upper and lower wall sections which are normally relatively closely spaced for guiding the computer form web therebetween. The upper chute has a curved free end portion for guiding the web to and from a first horizotal feed tray. The curved end removes any rigidity which may have formed lengthwise in the web which would tend to hinder the feeding thereof. The remaining portion of the chute is along a straight line path inclined downwardly toward the upper surface of the copyboard. To permit easy threading of the web into the curved end of the chute, the upper wall thereof is pivotally mounted on a pair of outwardly extending arms. As such the upper wall can be moved away from the lower wall to provide access for manually passing the web therehrough. Because the upper wall is mounted on the outwardly extending arms, ample clearance between the ends of the chute walls at both ends thereof is provided.

The lower chute assembly which extends between the lower surface of the copyboard and a second supply tray likewise includes upper and lower walls. The chute walls are spaced relatively near each other and are bent to provide a first section which is inclined slightly downwardly from the lower surface of the copyboard, a second secton inclined downwardly at a greater angle and a third vertically oriented section to carry the web to and from the second supply tray located beneath the first supply tray. A "breaker" portion on the lower wall of the chute assembly breaks any rigid "beam-like" folds formed in the web which might tend to hinder the refolding and restacking thereof in the second tray.

In the case of the second chute assembly, the upper wall is connected to guide arms. The opposite ends of the arms include pins which are received in S-shaped guide slots or channels formed in the copyboard frame. The opposite end of the upper wall is mounted for pivotal movement also on the main frame of the computer form feed apparatus. Thus, upon pivoting the copyboard from a position overlying the original document platen on the copying machine to a raised, substantially vertically extending position, the pins follow the S-shaped guide slots thereby pivoting the upper wall of the lower chute assembly away from the lower wall, opening the end thereof adjacent the copyboard in which the computer web is inserted. Lowering of the copyboard closes the chute assembly to permit feeding of the web during operation of the computer form feed apparatus.

DETAILED DESCRIPTION OF THE DRAWINGS

Figure 1:
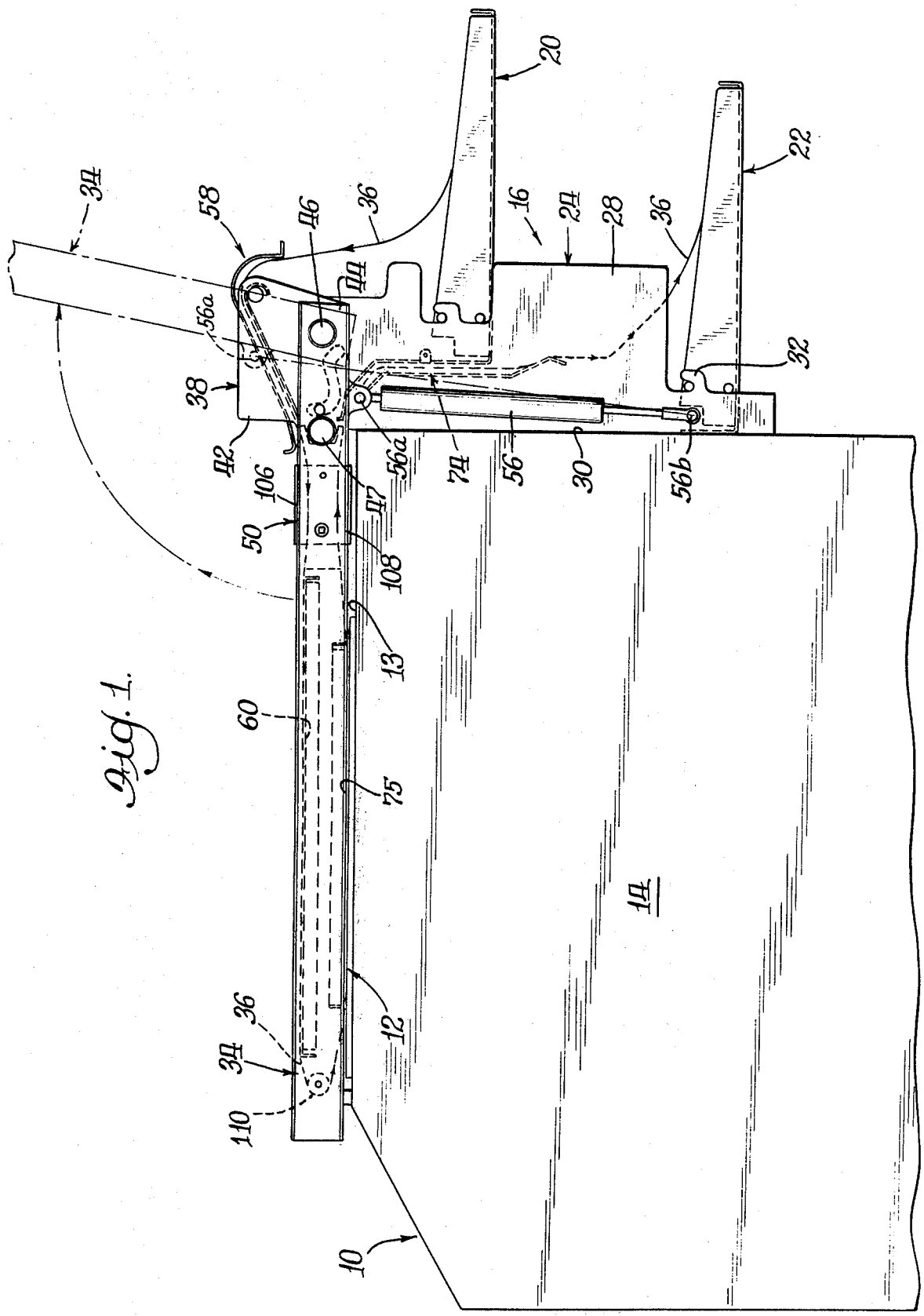
FIG. 1 is a side view of a copying machine having a computer form feeder mounted thereon for conveying computer printout form webs to the original document platen of the machine for copying, which has a copyboard with an improved chute arrangement included thereon according to the invention.
Figure 2:
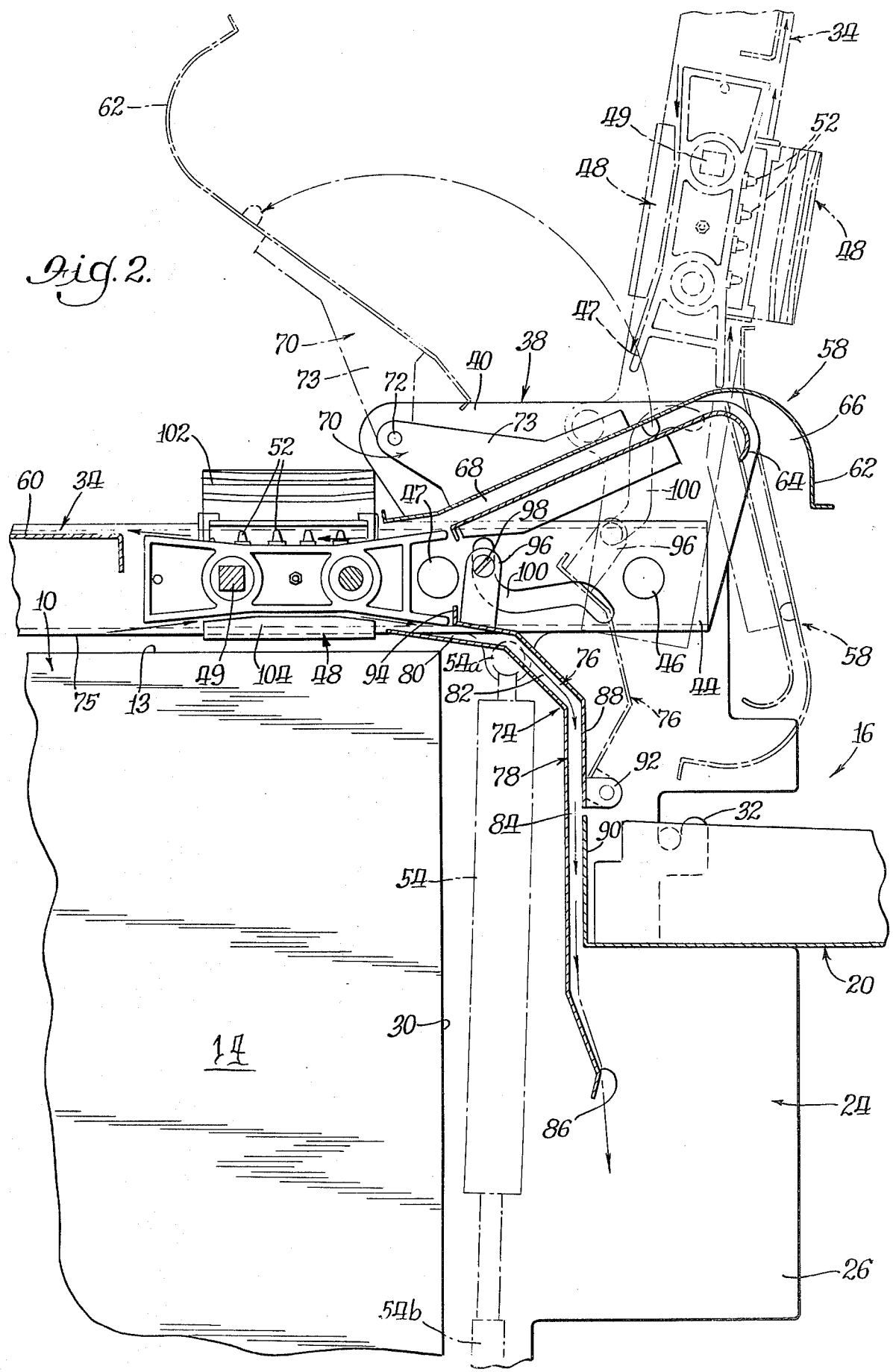
FIG. 2 is an enlarged side sectional view of the copying machine of FIG. 1, illustrating in greater detail the copyboard and improved chute arrangement according to the invention for conveying a computer printout web between a pair of trays to the original document platen of a copying machine.

Referring now to the drawings in greater detail, there is illustrated in FIGS. 1 and 2 thereof a copying machine designated generally by the numeral 10. The copying machine shown is of the electrostatic or xerographic type, but can take any form so long as it produces copies on a recording medium such as paper, microfilm or the like. The copying machine includes a transparent platen 12 (FIG. 1) located along the upper wall 13 thereof on which original documents and materials to be copied are placed. Conventional instrumentalities (not shown) to perform the copying process are included within the outer housing 14 of the machine.

A computer form feeder apparatus designated generally by the numeral 16 is mounted on the copying machine for conveying the computer printout web 36 between supply trays 20, 22, to the original document platen 12 of the copying machine.

The computer form feed apparatus includes a main frame 24 comprising a pair of spaced, vertically extending side walls 26, 28, respectively, which are hung on the side wall 30 of the copying machine on fasteners (not shown) extending therefrom. The trays 20, 22 are coupled at opposite sides to the walls 26, 28 of the main frame on bracket portions such as 32. The main frame 24 likewise supports a copyboard 34 overlying the glass platen 12 which carries the computer form printout web 36 to the platen.

A copyboard frame 38 having a pair of spaced side walls 40, 42 is coupled to the copyboard at a first end 44 thereof. A support shaft 46 extending from the side wall 28 of the main frame passes through a corresponding side wall 42 of the copyboard frame 38 and the copyboard 34 and frame 38 pivot thereabout. A drive pinion gear (not shown) is mounted on support shaft 46 and is driven rotatably thereon by a drive mechanism (not shown) to provide the driving force to the sprocket drive devices 48, 50 which convey the web 36 along the copyboard. Drive belts (not shown) extend between pinion 46 and shaft 47, and between shaft 47 and drive shaft 49 to turn moving drive chains (not shown) of the sprocket drive devices 48, 50. For a more detailed explanation of the last-mentioned drive mechanism and sprocket drive devices, see co-pending U.S. patent application Ser. No. 577,703 and 577,705, referred to heretofore.

The computer form web which conventionally includes spaced apertures formed along the edges thereof, is driven by the sprocket devices. The moving drive chains include pins such as 52. The pins extend through the apertures in the computer form web and thereby propel the web along the copyboard as the chains are moved. As mentioned heretofore, the copyboard 34 and frame 38 are pivotal about shaft 46 between a first position whereat the copyboard overlies the platen 12 of the copying machine and a second raised position shown in dotted lines in the figures, whereby the copyboard extends substantially vertically upward away from the platen. Threading of the computer form web about the copyboard is effected more easily because of the capability of raising the copyboard as described.

A pair of gas or hydraulic springs 54, 56 are coupled pivotally at opposite ends 54a, 54b and 56a, 56b to the copyboard frame 38 and main frame 24, respectively. The springs cushion and brake the movement of the copyboard as it is pivoted about shaft 46 between the positions described.

Coupled to the copyboard near end 44 thereof is a first upper chute assembly 58 which guides the computer form web 36 as it passes between the upper surface 60 of the copyboard and tray 20. The chute assembly 58 includes upper and lower wall members 62, 64 which are spaced from each other at relatively small distance along the entire length thereof to form a guide channel therebetween. A first end 66 of the chute assembly is curved to guide a computer printout web to or from tray 20. The curvature of the chute walls breaks any rigidity formed along the length of the web so that the web will be fed smoothly along the copyboard or into the tray 20 for restacking. The opposite end 68 of the chute assembly extends along a straight line toward the upper surface 50 of the copyboard for guiding the web 36 toward the sprocket devices 48, 50. The lower wall 64 of the chute assembly 58 is fixedly mounted between walls 40, 42 of the copyboard frame while the upper wall 62 is mounted on brackets such as 70 which are pivotally mounted by suitable fasteners 72 on the last-mentioned side walls. The brackets 70 include arms 73 which extend from the side walls 40, 42. The mounting of the upper wall in this fashion permits the upper wall to be pivoted away from the lower wall 64 as shown in dotted lines in FIG. 2, thereby permitting easy access to the chute for feeding the lead edge of the computer printout web 36 thereinto. Because the upper wall is mounted on the arms 73, both ends of the upper and lower chute assembly walls are separated when the upper wall is raised.

A lower chute assembly 74 is also provided in the computer form feeder apparatus for guiding the computer printout web 36 between the lower surface 75 of the copyboard and the lower tray 22. The lower chute assembly also includes upper and lower walls 76, 78, the walls being spaced along the lengths thereof slightly to form a channel therebetween for the passage of the web 36 therethrough. The walls are complementarily shaped to guide the web so that the latter is fed properly along its path. The chute assembly has a first straight line section 80 extending away from the lower surface of the copyboard, but angled slightly downwardly, a second straight line section 82 angled downwardly at a greater angle and a third straight line section 84 extending vertically downwardly. The bends in the chute walls between the sections described along with a breaker portion 86 formed on the free end of the lower chute wall 78, serve to break any "beam-like" folds which tend to be produced along the length of the web during its movement along the path to provide proper feeding and stacking of the web.

The lower wall 78 of the chute assembly is fixedly mounted on the main frame 24 between walls 26, 28 thereof. The upper wall 76 of the chute assembly 74 is in fact formed of two sections 88, 90, section 90 comprising the back wall of the upper feed tray 20. Section 88 of the upper wall is mounted at a first end 92 thereof at opposite sides for pivotal movement on walls 26, 28 of the main frame 24. The upper end 94 of the wall 76 is joined to arms such as 96, FIG. 2, having pins such as 98 extending therefrom. The pins are received in curved or S-shaped apertures or guide slots 100 formed in the side walls 40, 42 of the copyboard frame 38. Thus when the copyboard is pivoted from a position overlying the platen 12 to a raised position (shown in dotted lines) the pins 98 are moved along the guide slots 100, pivoting the upper chute wall 76 about end 92 to move the wall away from the lower wall 78 as shown in dotted lines in FIGS. 2 of the drawings. In this manner, the threading of the computer printout web into the end 80 of the chute assembly 74 is made simple. Lowering of the copyboard returns the upper chute wall 76 to its normal position.

A better understanding of the function of the chute arrangement according to the invention will be had from the followig description of the procedure for threading a computer form web therethrough.

Initially, a fan fold, stacked computer form web 36 is placed in upper tray 20. The lead edge of the web is fed into the curved end 66 of upper chute assembly 58. To facilitate the feeding of the lead edge of the web, upper wall 62 of the chute is pivoted from its normal position shown in solid lines on FIG. 2 to a position shown in dotted lines. The latter opens the chute assembly making it simple to slide the lead edge of the web downwardly along the lower wall 64 toward sprocket drive devices 48, 50. Once the lead edge passes from end 68 of the chute assembly 58, the upper wall is pivoted back to its normal position. Thereafter, the lead edge of the web is pulled toward the free end of the copyboard. Sufficient web material is required for wrapping the web about the roller 108 at the free end of the copyboard and returning it along the lower surface thereof into chute assembly 74. The copyboard is then pivoted about shaft 46 from a position overlying the platen (in solid lines) to a raised position (in dotted lines). The lifting of the copyboard is assisted by the action of gas springs 54, 56.

As the copyboard is lifted as described, pins such as 98, at end 92 of the upper wall of chute assembly 74 received in the S-shaped guide slots 100, follow along the path defined thereby. The movement of the pins pivots the upper wall 76 of the lower chute assembly about end 92 thereof (See FIG. 2) from a first closed or normal position shown in solid lines to a second open position, shown in dotted lines. In this fashion, the end 80 of the chute assembly 74 is widened, making it easy to insert the lead edge of the computer form web 36 into the chute assembly. Once the lead edge is passed through the chute toward tray 22, the covers 102, 104, 106, 108 of the sprocket drive devices 48, 50, respectively, can be closed to capture the web on the pins 52. The web now extends along a path from tray 20, through chute assembly 58, along the upper surface 60 of the copyboard, around the free end thereof over roller 108, along the lower surface of the copyboard 75 (along platen 12), through chute assembly 74 and into tray 22.

The web is driven between the trays in both directions for indexing individual web segments to platen 12 for copying. The chute assemblies guide the web as it is fed in either direction, and depending upon the direction of movement, serve to remove the web properly from the stack in the supply tray and refold and restack the web in the take-up tray.

While a particular embodiment of the invention has been shown and described, it should be understood that the invention is not limited thereto since many modifications may be made. It is therefore contemplated to cover by the present application any and all such modifications as fall within the true spirit and scope of the appended claims.

What we claim is:

1. A guide chute assembly for guiding a web of material between the lower surface of a copyboard mounted on the original document platen of a copying machine and a supply tray, the copyboard being mounted on support means for pivotal movement about a first end of said copyboard between a first position overlying the platen and a second raised position, said guide chute assembly comprising upper and lower predeterminedly shaped wall portions spaced from each other a predetermined distance along the length thereof to form a channel therebetween through which said web passes, the lower wall portion being fixedly mounted on said support means, the upper wall portion being mounted at a first end on said support means for pivotal movement thereabout, the opposite end of said upper wall portion being coupled to said copyboard for movement along a predetermined path defined thereon in response to the movement of said copyboard from said first to said raised position, whereby said upper wall portion is pivoted about said first end and is moved away from said lower wall to permit easy insertion of said web into said channel.

2. A guide chute assembly as claimed in claim 1 wherein said copyboard includes, formed thereon near said first end thereof, guide channel means having a predetermined shape and wherein said first end of said upper wall portion includes pin means received in said guide channel means, whereby upon movement of said copyboard from said first to said second position, said pin means is moved from a first position along said guide channel means to a second position therealong to pivot said upper wall about said opposite end for separating said upper wall from said lower wall.

3. A guide chute assembly as claimed in claim 2 wherein said guide channel means is generally S-shaped.

4. A guide chute assembly as claimed in claim 1 wherein said lower wall portion includes breaker means engaging said web to remove rigid folds formed along the length of said web as it is fed through said chute assembly.

5. In an apparatus for feeding a web between first and second supply trays along an upper surface, around a first, free end and along the lower surface of a copyboard overlying the original document platen of a copying machine for making copies of predetermined portions of said web, said copyboard being mounted on support means near the opposite end for pivotal movement thereabout between the position overlying the platen and a raised position, a guide chute arrangement through which said web passes for guidance thereof to and from said copyboard, said chute arrangement including: a chute assembly having upper and lower predeterminedly shaped wall portions spaced from each other along the length thereof to form a channel therebetween through which said web passes, a first end of said chute assembly being positioned adjacent the lower surface of the copyboard to guide the web between said lower surface and a first supply tray, the lower wall portion of said guide chute assembly being fixed mounted on said support means, the upper wall portion being mounted at a first end on said support means for pivotal movement and the opposite end of said upper wall portion being coupled to said copyboard for movement along a predetermined path defined thereon in response to the pivotal movement of said copyboard between said overlying and raised positions, whereby said upper wall portion is pivoted about said first end for separation thereof from said lower wall portion to facilitate insertion of said web into said chute assembly at said first end thereof.

6. A chute arrangement as claimed in claim 5 wherein the first end of said upper wall portion of said chute assembly is the end thereof away from said first end of said chute assembly, wherein said copyboard defines, near a first end thereof, a guide channel having a predetermined shape, and wherein said first end of said upper wall portion includes means received in said guide channel for movement therealong, whereby upon pivoting said copyboard from said overlying to said raised position, said means traverse said guide channel to pivot said upper wall portion about said first end to separate said upper and lower wall portions at the end thereof adjacent said copyboard, said upper wall portion being returned to its original position upon returning said copyboard to said overlying position.

7. A chute arrangement as claimed in claim 5 further including second support means coupled to said copyboard and a second chute assembly having upper and lower predeterminedly shaped wall portions spaced from each other along the length thereof to define a channel therebetween through which said web passes a first end of said second chute assembly being positioned adjacent the upper surface of said copyboard to guide said web between said upper surface and said second supply tray, the lower wall portion of said guide chute assembly being fixed mounted on said second support means and the upper wall portion being mounted for pivotal movement on said second support means, whereby said upper wall portion is pivotal between a first position overlying said lower wall portion to a second position separated therefrom to provide easy insertion of said web into the opposite end of said chute assembly.

8. A chute arrangement as claimed in claim 7 further including extension arm means coupling said upper wall portion of said second chute assembly and said second support means, said upper wall portion being pivotally mounted on said extension arm means and connected thereby to said support means, whereby upon pivoting said upper wall portion from said first to said second position both ends of said upper and lower wall portions are separated.

9. A guide chute arrangement as claimed in claim 5 wherein the free ends of said upper and lower wall portions of said second chute asembly are curved complementarily to each other for directing a web passing therebetween upwardly from and downwardly to, respectively, said second supply tray, said curved ends of said chute assembly engaging said web to remove any rigidity formed lengthwise therein to permit proper feeding of said web between said web between said upper surface of said copyboard and said second supply tray.

* * * * *

UNITED STATES PATENT OFFICE
CERTIFICATE OF CORRECTION

Patent No. 3,972,461                          Dated August 3, 1976

Inventor(s) George J. Zahradnik et al.

It is certified that error appears in the above-identified patent and that said Letters Patent are hereby corrected as shown below:

Column 5, line 21, should read -- from the following description of the procedure for --.

Column 8, line 5, should read -- chute assembly being fixedly mounted on said second --.

*Signed and Sealed this*

Fourteenth *Day of* December 1976

[SEAL]

Attest:

RUTH C. MASON
*Attesting Officer*

C. MARSHALL DANN
*Commissioner of Patents and Trademarks*